United States Patent
Nishide

(10) Patent No.: US 6,795,269 B2
(45) Date of Patent: Sep. 21, 2004

(54) VIDEO RECORDER HOUSING WHOSE PIVOTING GATE PERMITS BACKBONE OF VIDEOCASSETTE FITTED INSIDE BE SEEN FROM OUTSIDE

(75) Inventor: Masahiko Nishide, Fukui (JP)

(73) Assignee: Orion Electric Co., Ltd. (JP)

( * ) Notice: Subject to any disclaimer, the term of this patent is extended or adjusted under 35 U.S.C. 154(b) by 91 days.

(21) Appl. No.: 10/103,324

(22) Filed: Mar. 21, 2002

(65) Prior Publication Data

US 2002/0145821 A1 Oct. 10, 2002

(30) Foreign Application Priority Data

Mar. 21, 2001 (JP) ........................................ 2001-080939

(51) Int. Cl.[7] .............................................. G11B 15/00
(52) U.S. Cl. ..................................................... 360/96.5
(58) Field of Search ............................. 360/965, 90, 93

(56) References Cited

U.S. PATENT DOCUMENTS 4,835,636 A * 5/1989 Kanai et al. ............... 360/96.5
5,414,573 A * 5/1995 Koga et al. .................... 360/93
5,898,536 A * 4/1999 Won .......................... 360/96.5

FOREIGN PATENT DOCUMENTS

| JP | 56016905 A | * | 2/1981 |
| JP | 04228159 A | * | 8/1992 |
| JP | 09-274790 | | 10/1997 |
| JP | 10283719 A | * | 10/1998 |
| JP | 11025548 A | * | 1/1999 |

* cited by examiner

*Primary Examiner*—Tianjie Chen
(74) *Attorney, Agent, or Firm*—Schulte Roth & Zabel; Joel E. Lutzker; John C. Garces

(57) ABSTRACT

A video recorder housing has a pivoting gate to open and close the cassette slot of the video recorder. The pivoting gate has a movable hook secure to its rear side. When a video cassette is inserted into the cassette slot to be loaded into the housing, the movable hook partially appears from the lower edge of the pivoting gate, and the pivoting gate remains partially open with the protruding hook resting on the upper surface of the video cassette. The partially open pivoting gate exposes the label of the video cassette to be seen from the outside.

3 Claims, 6 Drawing Sheets

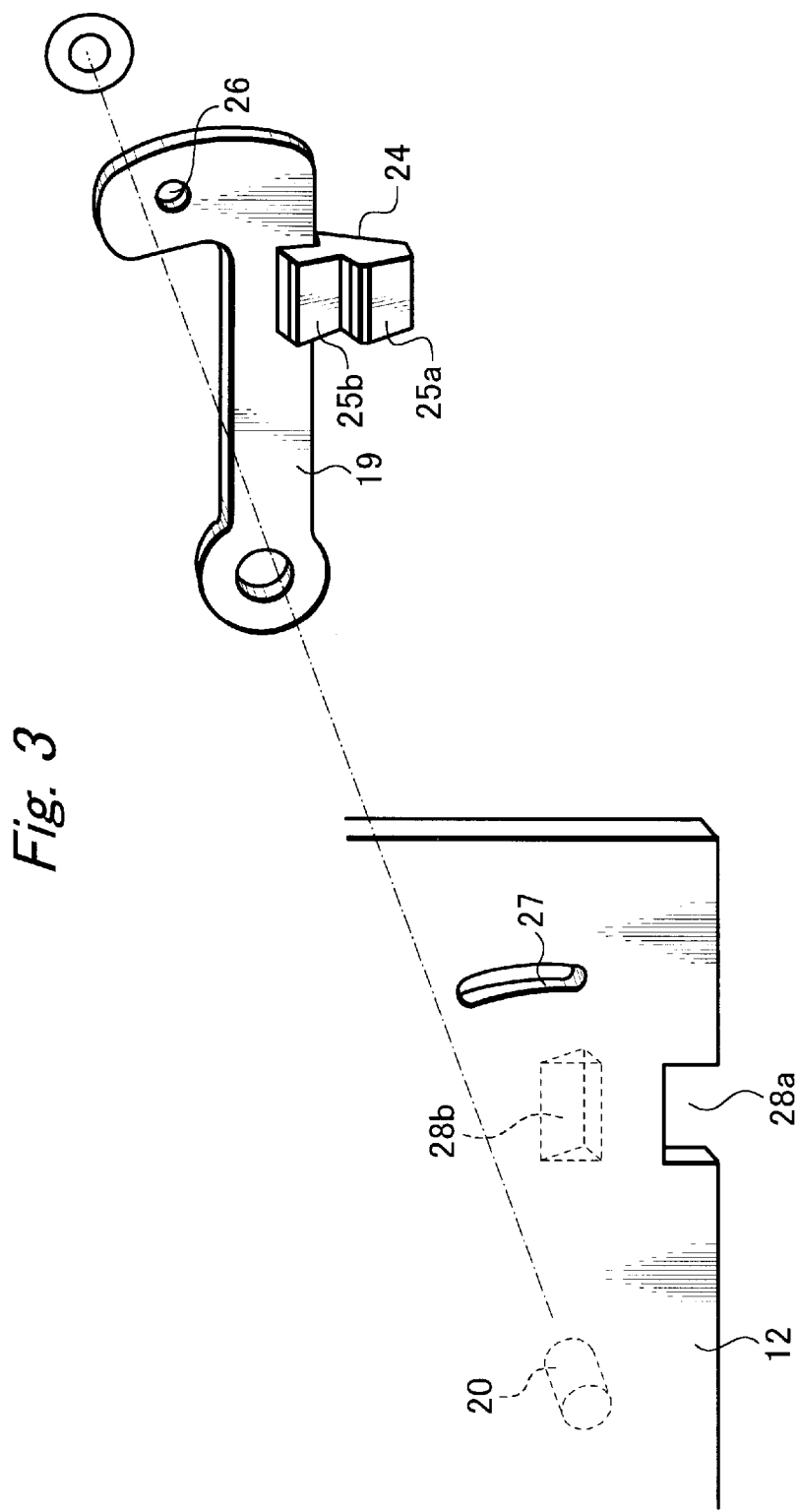

VIDEO RECORDER HOUSING WHOSE PIVOTING GATE PERMITS BACKBONE OF VIDEOCASSETTE FITTED INSIDE BE SEEN FROM OUTSIDE

BACKGROUND OF THE INVENTION

1. Field of the Invention

The present invention relates to a video recorder housing having a pivoting gate permitting a backbone or rear side of a videocassette fitted in the housing to be seen from the outside of the video recorder.

2. Related Arts

Referring to FIG. 6, a video recorder housing 1 has a cassette slot 2 formed within its front side for inserting and removing a videocassette 3 from the housing 1. Housing 1 has a pivoting gate to close and open the cassette slot 2. When loading the video recorder with a videocassette, the cassette is applied to the gate to push the gate open.

The videocassette is then pushed forward onto the cassette guide to be lowered and placed on the reel stage. FIG. 7 shows how the videocassette 3 is positioned inside the video recorder. In the loading position, the videocassette 3 is positioned on the reel stage behind the cassette guide 4 to be flush with the lower edge of the cassette slot 2, thus putting label 5 of the videocassette 3 out of sight for an outside observer. In this position, the label 5 of the videocassette 3 cannot be seen even if the gate 6 is opened fully. Label 5 of the videocassette 3 cannot be seen without taking the videocassette 3 out of the housing 1. Alternatively, the videotape may be played back to see the title of the recorded program. In any event, once the videocassette has been loaded into the housing 1, it cannot be immediately confirmed which videotape is in the video recorder.

To reduce the above described inconvenience, the cassette guide 4 may be notched to provide a chamfered end 7, thereby permitting observers to see the label 5 of the video cassette 3 from the outside. Alternatively, a transparent gate may be used to allow observers to see the cassette inside the housing. Use of the transparent gate, however, causes some adverse effects on the function of the videotape recorder because of invasion of the surrounding light inside the recorder. Additionally, it is a common practice in the video recorders industry to print a brand name of the manufacturer on the gate of the housing. However, no such information can be printed on the transparent gate 6.

Japanese Patent 9-274790(A) discloses a video recorder housing using a transparent gate and an information-bearing gate, both pivoted at the front and rear, respectively, of the cassette slot. The transparent and imprinted gate are so operatively connected that a videotape cassette loaded inside the housing may be visible through the transparent gate, while the imprinted gate is pushed up and laid on the upper surface of the videocassette. When no videocassette is loaded inside, the information printed on the rear gate may be seen through the front transparent gate. One of the disadvantages of this double gated structure is that its associated actuator mechanism substantially increases the manufacturing cost of the video recorder.

SUMMARY OF THE INVENTION

Accordingly, it is an object of the present invention is to provide a video recorder housing having a pivoting gate permitting a backbone or rear side of a videocassette fitted inside the housing to be seen from the outside.

It is another object of the present invention to provide a videocassette-observable video recorder housing without a substantial increase in the manufacturing cost of the video recorder housing.

To attain these objects a video recorder housing having a pivoting gate to open and close the cassette slot for inserting and removing a video cassette from the video recorder, is improved according to the present invention. The improvement to the housing is in that a housing gate has an engagement projection formed at its one end, which engagement projection is adapted to be engaged by a provided rotary lever of the housing. This construction enables the gate to rotatably raise toward its opening position by the rotary lever when the lever turns upwards.

The gate further has a movable hook so fixed onto the rear side of the gate that the movable hook may partly appear from a lower edge of the gate when the hook is placed into its descending position. The hook may have a rotary arm integrally fixed thereto and allowing the movable hook to partly appear from the lower edge of the gate when the arm is rotated about its pivot. The hook may be vertically movably secured to the rear side of the gate allowing the movable hook to partly appear from the lower edge of the gate by moving the hook downwards.

When it is desired that the backbone of a loaded videocassette was visible from the outside, the movable hook is rotated or pushed down to partly appear from the lower edge of the pivoting gate. The videocassette is then inserted into the cassette slot by pushing the pivoting gate open wide enough to allow the videocassette to enter the housing. The movable hook caught on the upper surface of the videocassette keeps the pivoting gate in the raised position leaving a lateral space between the lower edge of the cassette slot and the lower edge of the pivoting gate. This lateral space is sufficiently wide to expose the label of the loaded videocassette. Insertion of the videocassette into the housing of the video recorder with the movable hook withdrawn and hidden behind the gate allows the gate to close the cassette slot completely.

The above and other objects, aspects, features and advantages of the invention will be more readily apparent from the description of the preferred embodiment thereof taken in conjunction with the accompanying drawings and appended claims.

BRIEF DESCRIPTION OF THE DRAWINGS

The invention is illustrated by way of example and not limitation and the figures of the accompanying drawings in which like references denote like or corresponding parts, and in which:

FIG. 3 is an exploded view of an armed hook to be pivoted onto the rear side of the pivoting gate;

DETAILED DESCRIPTION OF THE PREFERRED EMBODIMENT AND THE DRAWINGS

Figure 1:
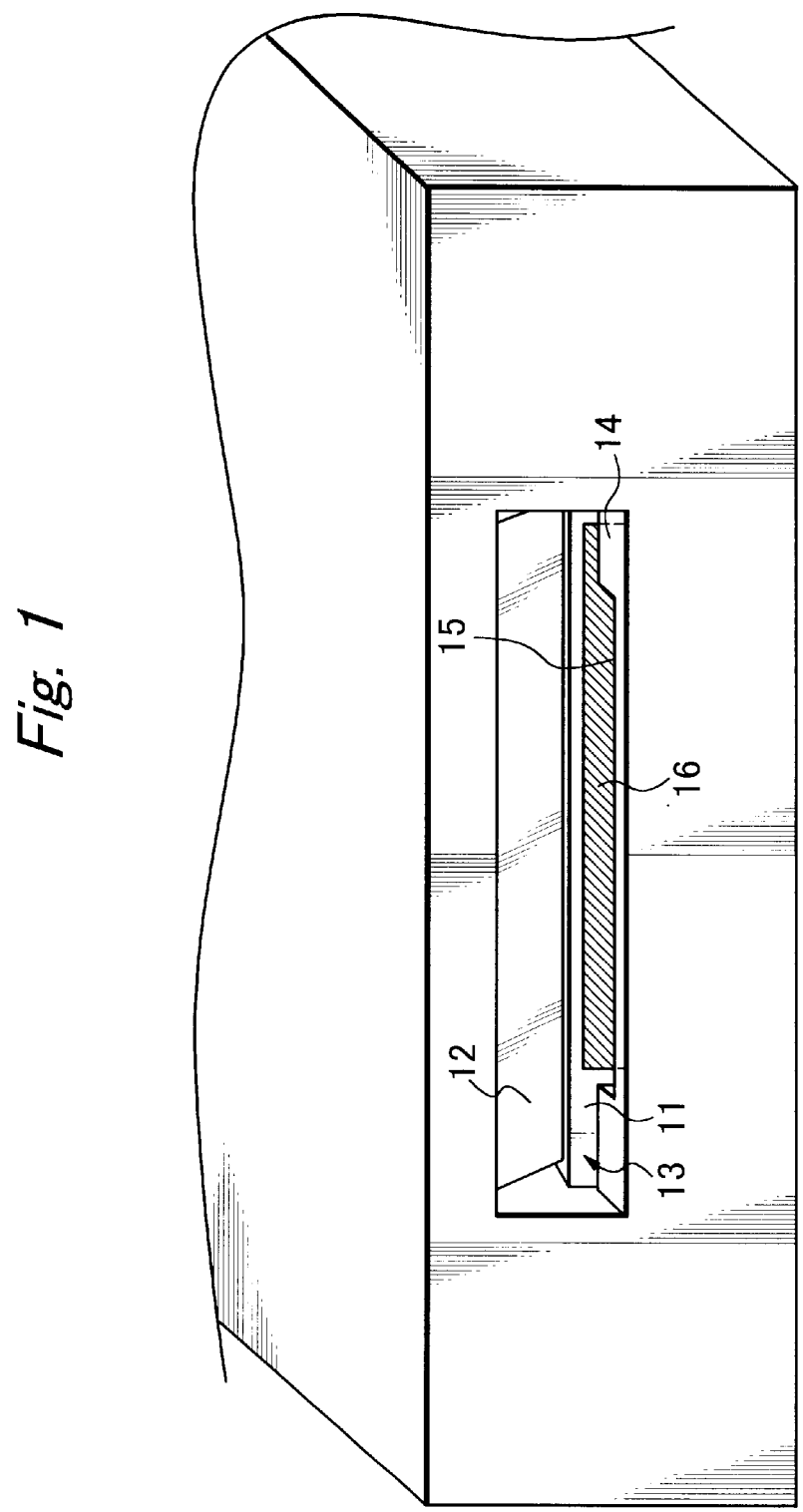
FIG. 1 is a perspective view of a video recorder according to one embodiment of the present invention, wherein the video recorder housing is loaded with a videocassette.

Referring to FIG. 1, a housing of a video recorder is loaded with a videotape cassette 11, allowing the pivoting gate 12 to partially close the cassette slot 13. The cassette guide 14 is chamfered to form a lateral recess 15, thereby permitting the label 16 on the backbone or rear side of the videocassette to be seen from the outside. The pivoting gate 12 is prevented from closing the cassette slot 13 completely by allowing a rotatable armed hook provided on the gate to be engaged by an upper surface of the videocassette, as described in detail later.

Figure 2A:
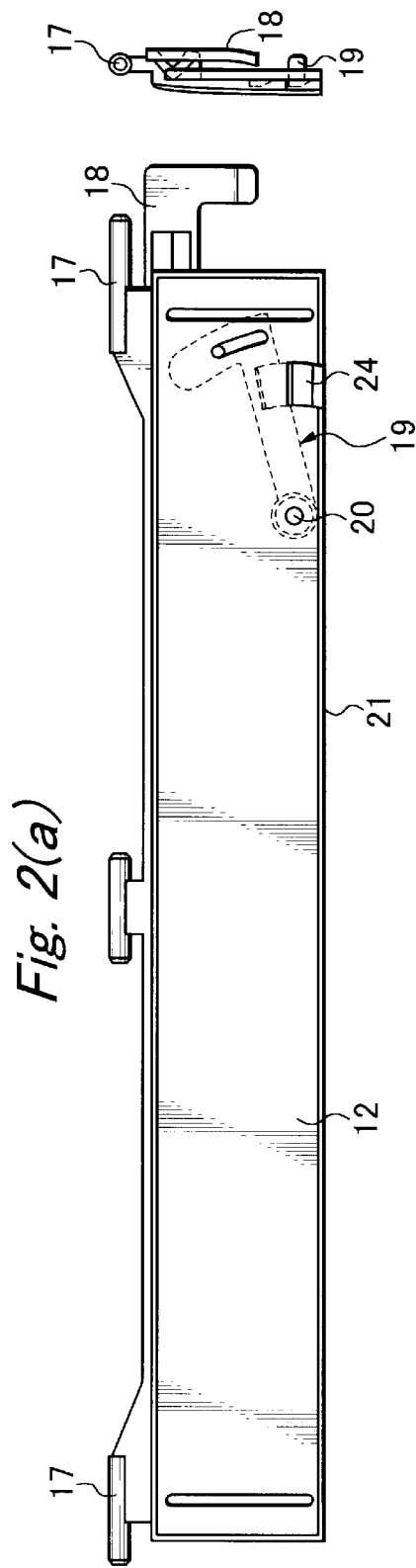
FIG. 2(a) is a front and a side view of the pivoting gate without the hook protruding therefrom.
Figure 2B:
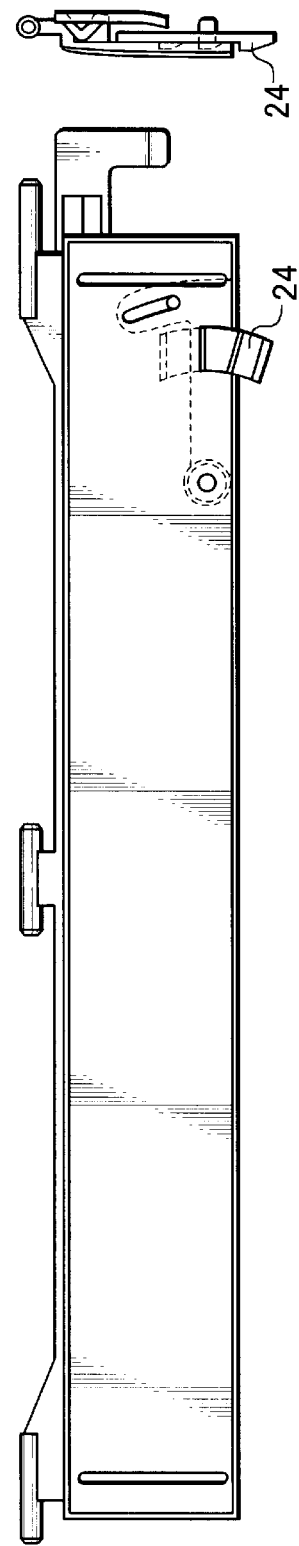
FIG. 2(b) is a front and a side view of the pivoting gate with the hook protruding therefrom.

FIG. 2(a) shows one embodiment of the pivoting gate 12. The gate preferably includes a rectangular plate sized large enough to close the opening of the cassette slot 13. The rectangular plate has pivots 17 integrally connected to its opposite upper corners, and an L-shaped engagement piece 18 integrally connected to one side of the rectangular plate. An L-shaped arm 19 is rotatably secured to the rear side of the rectangular plate by a pivot 20, permitting the arm 19 to turn about its pivot 20. The L-shaped arm 19 has a two-stepped hook 24 integrally connected to its longer leg. Clockwise rotation of the L-shaped arm 19 about the pivot 20 allows the hook 24 to partially protrude from the lower edge 21 of the pivoting gate 12. Counterclockwise rotation of the L-shaped arm 19 allows the hook 24 to withdraw and to be flush with the lower edge of the pivoting gate 12, as shown in FIG. 2(b).

As shown in FIG. 3, an indentation-and-notch 28, which is formed in the rectangular plate of the gate 12, engages the hook 24, thereby preventing the pivoting arm 19 from descending under the force of its gravity and from allowing the hook 24 to protrude from the lower edge of the pivoting gate 12. The same indentation-and-notch 28 also prevents the pivoting arm 19 from rising and pulling the hook 24 up to be flush with the lower edge of the pivoting gate 12, when the hook 24 is engaged by the indentation-and-notch 28 in a different way, as described later.

FIG. 2(a) shows how the hook 24 is pulled up to be flush with the lower edge of the pivoting gate 12. FIG. 2(b) shows how the hook 24 partially protrudes from the lower edge 21 of the pivoting gate 12.

Referring to FIG. 3, the pivoting gate 12 has an upper indentation 28b and a lower notch 28a formed thereon. As mentioned above, the L-shaped arm 19 includes the two-stepped hook 24 integrally connected to its lower side. As seen from the drawing, the hook 24 has two steps 25a and 25b preferably formed on its front side. The L-shaped arm 19 has a thumb pin (not shown) press-fitted in the hole 26, which is formed at the rising end of the L-shaped arm 19. The arm 19 is pivoted to the rear side of the rectangular plate 12 to rotate about its pivot 20. The rectangular plate 12 has an arc-shaped slit 27 made to be in conformity with the arc path formed by the thumb pin follow the rotation of the pivoting arm 19. By moving the thumb pin along its path in the arc-shaped slit 27 the pivoting arm 19 is forced to rotate about the pivot 20.

To force the hook 24 to partially protrude from the lower edge 21 of the pivoting gate 12, the thumb pin is moved down along its path to the lower end of the arc-shaped slit 27. The upper step 25b of the hook 24 will then become engaged by the catch indentation 28a. To return the hook 24 into its original position where it does not protrude from the lower edge of the gate 12, the thumb pin is moved to the upper end of the arc-shaped slit 27. The catch recess 25 b then engages the lower step 25a of the hook 24.

Figure 4A:
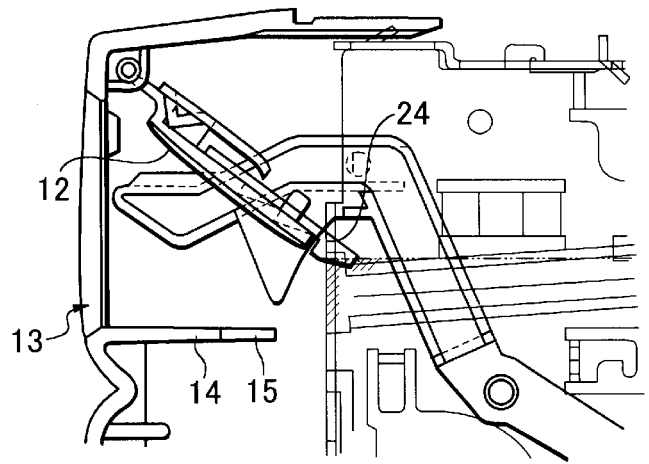
FIG. 4(a), FIG. 4(b) and FIG. 4(c) show how a videocassette can be ejected from the inside of the video recorder housing when the armed book is partially protruding from the pivoting gate.

The manner in which a videocassette 11 is unloaded is described below with reference to FIGS. 4(a), (b) and (c). FIG. 4(a) shows that when the video cassette 11 is loaded in the housing the pivoting gate 12 is half open. The hook 24 partially protrudes from the lower edge of the pivoting gate 12 to rest on the upper surface of the video cassette 11, thereby preventing the pivoting gate 12 from closing the cassette slot 13.

Figure 4B:
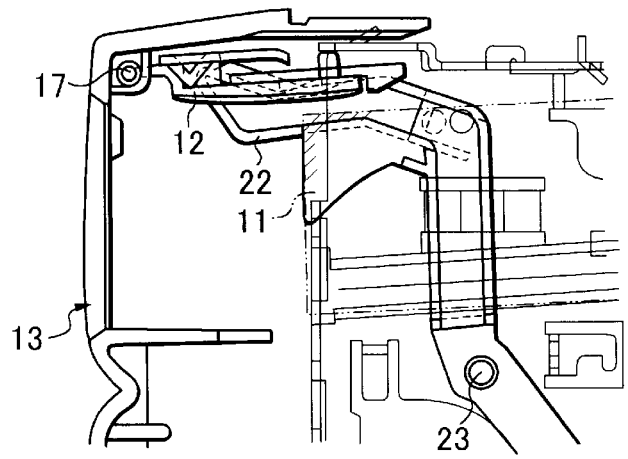

FIG. 4(b) shows that when the videocassette 11 is raised the pivoting gate 12 is also raised by the actuating lever 22, thereby opening the pivoting gate 12 completely and permitting the videocassette 11 to be ejected from the housing. The actuating lever 22 is constructed to rotate clockwise about its pivot 23. As the videocassette continues to raise, the pivoting gate 12 is engaged by the rising end of the actuating lever 22 via the engagement piece 18. Accordingly, the pivoting gate 12 rotates counterclockwise about its pivot 17 up to the position in which the cassette slot 13 opens fully. The actuating lever 22 is well known per se, and no detailed description is believed necessary.

Figure 4C:
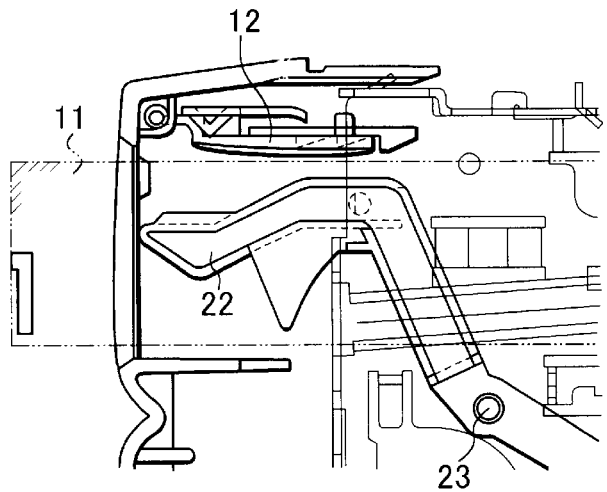

Once the videocassette has been raised up to the same level as the cassette slot, the videocassette 11 appears partly from the cassette slot 13 and can be ejected from the housing, as shown in FIG. 4(c). In this position, the pivoting gate 12 rests on the upper surface of the videocassette, and therefore, the videocassette 11 can be taken out without the necessity of rotating and raising the pivoting gate 12 still higher.

When the hook 24 partially appears from the lower edge of the pivoting gate 12, the gate remains half open (see FIG. 4a), thereby permitting the label 16 on the rear side of the videocassette to be seen from the outside. Conversely, if the hook 24 is flush with the lower edge of the pivoting gate 12, the gate will close the cassette slot as soon as the videocassette is loaded into the housing.

Figure 5A:
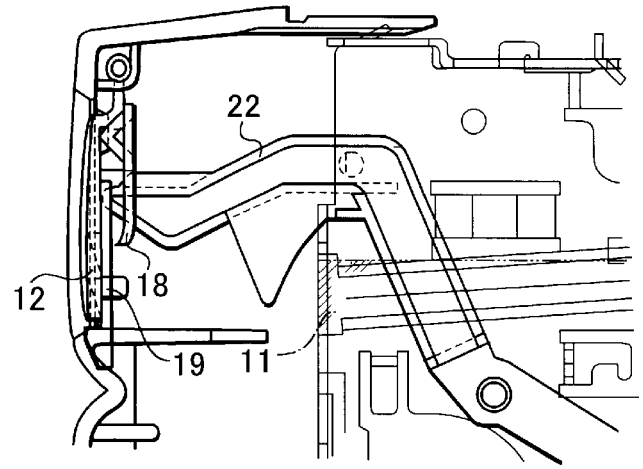
FIG. 5(a), FIG. 5(b) and FIG. 5(c) shows how a videocassette can be ejected from the inside of the video recorder housing when the armed hook is withdrawn to be hidden behind the gate.

The manner in which the videocassette 11 is ejected from the housing when the hook 24 does not protrude from the lower edge of the pivoting gate 12, is described below with reference to FIGS. 5(a)–5(c). As shown in FIG. 5(a), when the video cassette 11 is loaded into the housing, the pivoting gate 12 closes the cassette slot completely because the hook 24 does not prevent the gate from closing. In this position, the end of the actuating lever 22 is caught by the engagement piece 18 of the pivoting gate 12.

Figure 5B:
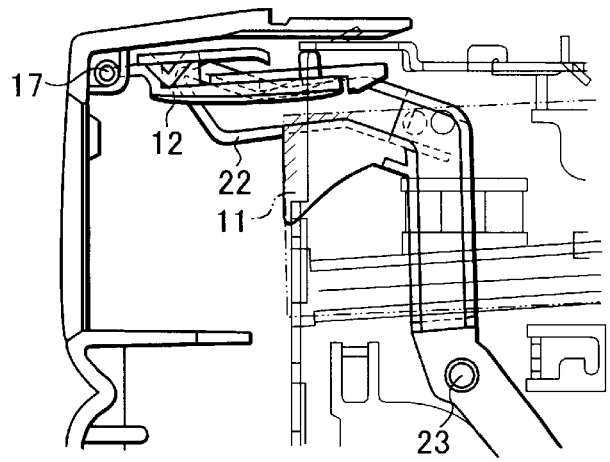
Figure 5C:
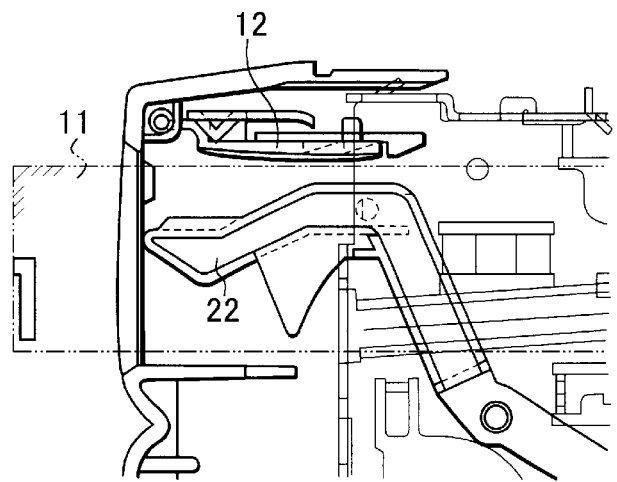
Figure 6:
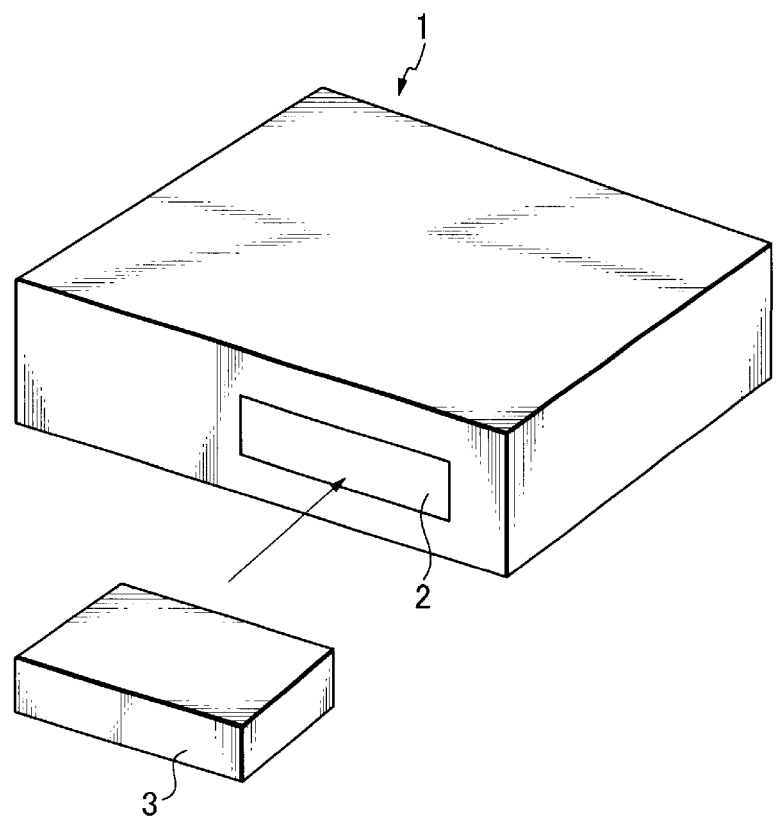
FIG. 6 is a perspective view of a video recorder.
Figure 7:
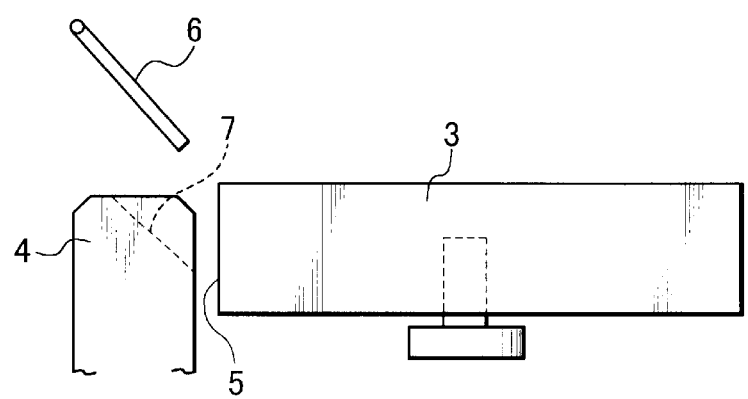
FIG. 7 illustrates positioning of a videocassette in the housing of the video recorder.

As seen from FIG. 5(b), when the videocassette 11 raises, the actuating lever 22 rotates clockwise about the pivot 23, allowing its end to raise the engagement piece 18, and accordingly allowing the pivoting gate 12 to rotate counterclockwise about its pivot 17 until the cassette slot opens completely. Thus, the videocassette 11 can be ejected from the cassette slot 13, as shown in FIG. 5(c).

In this mode of operation of the present invention, when the videocassette 11 is loaded into the housing, the pivoting gate 12 is closed completely, making the label 16 of the rear side of the videocassette 11 invisible from the outside. As may be understood from the above, the clockwise or counterclockwise rotation of the pivoting arm 19 permits the cassette slot 2 to be selectively partially or fully closed.

As an alternative to the pivoting arm 19 a vertical rod having a hook formed on its lower end may be used. The hook may be made to appear or disappear from the lower edge of the pivoting gate by lowering or raising the vertical rod on the rear side of the pivoting gate.

As may be understood from the above, the pivoting gate can be partially opened simply by protruding the hook from the lower edge of the pivoting gate. As the videocassette is pushed into the housing, the protruding hook of the pivoting gate is allowed to rest on the upper side of the video cassette, leaving the lateral space between the chamfered lower edge of the cassette slot and the lower edge of the pivoting gate. This lateral space is wide enough to see the label on the rear side of the video cassette from the outside.

Attaching the movable hook to the rear side of the pivoting gate according to the present invention requires no modification in designing the cassette ejecting mechanism. When it is not desired that the pivoting gate remains partially open when the videocassette is loaded, the movable hook may be pulled up to be flush with the lower edge of the pivoting gate.

Although the invention has been described with reference to the preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

What is claimed is:

1. A video recorder housing comprising:
   a cassette slot for inserting and removing a video cassette from the video recorder; and
   a pivoting gate configured to open and close said cassette slot,
   wherein said pivoting gate comprises an engagement projection formed at one end of said pivoting gate; wherein said engagement projection is configured to be selectively engaged by a rotary lever of said housing so that said pivoting gate is rotatably raised toward its opening position by said rotary lever when said rotary lever turns upwards; and wherein said gate further comprises a movable hook coupled to a rear side of said pivoting gate to being selectively moved to protrude from a lower edge of said pivoting gate to thereby position said gate in a partially open state.

2. The video recorder housing according to claim 1, wherein said movable hook comprises a rotary arm integrally fixed thereto, said rotary arm comprising a pivot and said rotary arm being configured to allow said movable hook to protrude from said lower edge of said pivoting gate by rotating said rotary arm about said pivot.

3. The video recorder housing according to claim 1, wherein said movable hook is vertically movably secured to the rear side of said pivoting gate and wherein said movable hook is configured to protrude from said lower edge of said pivoting gate when said movable hook is moved downwards.

* * * * *